United States Patent [19]

Brennan

[11] Patent Number: 4,500,655
[45] Date of Patent: Feb. 19, 1985

[54] ALKOXYLATED MODIFIED MANNICH CONDENSATES AND MANUFACTURE OF RIGID POLYURETHANE FOAMS THEREWITH

[75] Inventor: Michael E. Brennan, Austin, Tex.

[73] Assignee: Texaco Inc., White Plains, N.Y.

[21] Appl. No.: 566,756

[22] Filed: Dec. 29, 1983

[51] Int. Cl.³ .............................................. C08G 18/14
[52] U.S. Cl. .................................... 521/163; 521/167; 252/182; 525/507; 528/111
[58] Field of Search ................ 521/163, 167; 528/111; 525/507; 252/182

[56] References Cited

U.S. PATENT DOCUMENTS

| | | | |
|---|---|---|---|
| 3,297,597 | 1/1967 | Edwards et al. | 260/2.5 |
| 3,328,321 | 6/1967 | Wismer et al. | 260/2.5 |
| 4,137,265 | 1/1979 | Edwards et al. | 260/570.9 |
| 4,139,501 | 2/1979 | Rudner et al. | 521/136 |
| 4,147,678 | 4/1979 | Mao et al. | 260/28.5 |
| 4,198,490 | 4/1980 | Owen | 521/166 |
| 4,221,875 | 9/1980 | Yukuta et al. | 521/128 |
| 4,293,657 | 10/1981 | Nissen et al. | 521/121 |
| 4,312,988 | 1/1982 | Jacobs et al. | 544/196 |
| 4,317,889 | 3/1982 | Pcolinsky | 521/107 |
| 4,369,258 | 1/1983 | Johnson | 521/107 |

OTHER PUBLICATIONS

Copending U.S. patent application Ser. No. 06/545,422, filed Oct. 25, 1983, Brennan et al., "Mannich Condensates Having Fire Retardancy Properties and Manufacture of Rigid Polyurethane Foam Therewith".

Copending Brennan et al., U.S. patent application Ser. No. 06/545,421, filed Oct. 25, 1983, "Modified Mannich Condensates and Manufacture of Rigid Polyurethane Foam with Alkoxylation Products Thereof".

Copending Brennan et al., U.S. patent application Ser. No. 06/545,423, filed Oct. 25, 1983, "Mannich Condensates Having Fire Retardancy Properties and Manufacture of Rigid Polyurethane Foam Therewith".

Primary Examiner—Maurice J. Welsh
Attorney, Agent, or Firm—Jack H. Park; Kenneth R. Priem

[57] ABSTRACT

This invention relates to polyols that can be used to prepare rigid foams, such polyols being prepared by reacting a propoxylation product with melamine and a lower alkylene carbonate. The propoxylation product (which can contain some ethylene oxide) is prepared by propoxylating a Mannich condensate prepared by reacting phenol or a $C_1$–$C_{12}$ alkylphenol with formaldehyde and diethanolamine in the mole ratios of from 1:1:1 to about 1:3:3.

21 Claims, No Drawings

ALKOXYLATED MODIFIED MANNICH CONDENSATES AND MANUFACTURE OF RIGID POLYURETHANE FOAMS THEREWITH

BACKGROUND OF THE INVENTION

1. Technical Field of the Invention

This invention relates to propoxylated modified Mannich condensates useful in the facile manufacture of rigid polyurethane foam. This invention also relates to the manufacture of rigid polyurethane foams using the propoxylated modified Mannich condensates. The invention is based upon the discovery that unique polyols are provided by propoxylating a product prepared by reacting melamine with a lower alkylene carbonate in the presence of Mannich condensates of a phenol, formaldehyde and diethanolamine. One of the unique features of the present invention is the discovery that improved reaction profiles are obtained in making rigid polyurethane foam when using the polyols of the present invention.

2. Prior Art

Wismer et al. U.S. Pat. No. 3,328,321 is directed to polyurethanes prepared from polyisocyanates and a polyhydroxy resinous reaction product of an amino-s-triazine with an alkylene carbonate or an alkylene oxide. Among the amino-s-triazines that are suggested is melamine. In the working examples Wismer et al. disclose a polyol prepared by reacting benzoguanamine with ethylene carbonate and the reaction of this polyol with an isocyanate to prepare a polyurethane foam.

Edwards et al. U.S. Pat. No. 3,297,597 is directed to Mannich condensates of a phenolic compound, formaldehyde, and an alkanolamine which are then alkoxylated, preferably with propylene oxide, to provide polyols useful in the manufacture of rigid polyurethane foams.

Edwards et al. U.S. Pat. No. 4,137,265 is similarly directed to Mannich condensates prepared by reacting a phenolic compound with formaldehyde and diethanolamine which are then propoxylated and used in the manufacture of rigid polyurethane foam.

Rudner et al. U.S. Pat. No. 4,139,501 is directed to the manufacture of flexible polyurethane foam wherein the fire retardancy properties of the foam are improved by utilizing, in its preparation, a derivative of melamine wherein one or more of the hydrogens have been replaced by a hydroxymethyl group.

Mao et al. U.S. Pat. No. 4,147,678 proposes to improve the fire retardancy properties of polyurethane elastomers by utilizing a hexaalkoxymethylol melamine as a polyol component.

Owen U.S. Pat. No. 4,198,490 is directed to the manufacture of rigid polyurethane foam from a polyol reaction product containing a N-α-alkylol, such as trimethylolmelamine.

Yukuta et al. U.S. Pat. No. 4,221,875 is directed to rigid polyurethane foams having flame resistance which are prepared from a mixture comprising a polyhydroxy compound such as an ethylene oxide adduct of a material containing a plurality of hydroxyl groups (i.e., sucrose or sorbitol), an organic polyisocyanate, a blowing agent and powdered melamine. From 20 to 60 parts by weight of powdered melamine per 100 parts of polyhydroxy compound are recommended.

Nissen et al. U.S. Pat. No. 4,293,657 discloses the preparation of a stable dispersion useful in the preparation of polyurethane foam prepared by the in situ reduction of finely powdered melamine with a stabilizer such as silicic acid, salts of perfluorinated alkylcarboxylic acids or salts of fatty alcohol sulfates.

Jacobs et al. U.S. Pat. No. 4,312,988 is directed to the preparation of hydroxy terminated melamine derivatives wherein melamine is reacted with isopropanolamine in order to minimize the amount of isomelamine impurities that are normally formed when melamine is reacted with an alkanolamine.

Pcolinsky, Jr. U.S. Pat. No. 4,317,889 and the numerous U.S. patents cited therein disclose the use of melamine derivatives such as hydroxymethyl melamines, melamine phosphate, hexaalkoxymethylmelamine, etc. as a component for use in the manufacture of flexible polyurethane foams.

Johnson U.S. Pat. No. 4,369,258 is directed to polyurethane foams prepared by reacting a polyisocyanate with a mixture of a melamine polyol with a polyol derived from a polyester or a polyether polyol.

RELATED COPENDING PATENT APPLICATIONS

Brennan et al. U.S. patent application Ser. No. 06/545,422, filed Oct. 25, 1983 and entitled "Mannich Condensates Having Fire Retardancy Properties and Manufacture of Rigid Polyurethane Foam Therewith" is directed to an invention wherein melamine is dissolved in a propoxylated Mannich condensate of phenol, formaldehyde and diethanolamine to provide a modified polyol which is useful in making rigid polyurethane foam having improved fire retardancy properties.

Brennan et al. U.S. patent application Ser. No. 06/545,421, filed Oct. 25, 1983 and entitled "Modified Mannich Condensates and Manufacture of Rigid Polyurethane Foam with Alkoxylation Products Thereof" is directed to an invention wherein a Mannich condensate of phenol, formaldehyde and an amine mixture consisting of diethanol and melamine is alkoxylated with propylene oxide to provide a modified polyol which is also useful in the manufacture of rigid polyurethane foams having improved fire retardancy properties.

Brennan et al. U.S. patent application Ser. No. 06/545,423, filed Oct. 25, 1983 and entitled "Mannich Condensates Having Fire Retardancy Properties and Manufacture of Rigid Polyurethane Foam Therewith" is directed to a polyol prepared by heating a mixture of a Mannich condensate of a phenol, formaldehyde and diethanolamine with melamine and formaldehyde to provide a reaction product which is then propoxylated to provide a polyol useful in the manufacture of rigid polyurethane foam having improved fire retardancy properties.

SUMMARY OF THE INVENTION

In one aspect, the present invention is directed to polyols prepared by reacting melamine with a lower alkylene carbonate in admixture with propoxylated Mannich condensates prepared from a phenol, formaldehyde and diethanolamine.

In another aspect of the present invention, improved reaction profiles are achieved when a modified polyol based upon a Mannich condensate, as just described, is reacted with an organic polyisocyanate in the presence of a blowing agent, a catalyst, and other appropriate components, in order to manufacture a rigid polyurethane foam.

DETAILED DESCRIPTION

The Modified Polyol

The principal components of the present invention are melamine, a lower alkylene carbonate (e.g., ethylene carbonate, propylene carbonate, etc.), a Mannich condensate of a phenol, formaldehyde and diethanolamine and propylene oxide (with which a minor amount of ethylene oxide may also be used, if desired).

The phenolic compound, the formaldehyde and the diethanolamine are reacted together to form a Mannich condensate, as disclosed, for example in Edwards et al. U.S. Pat. No. 3,297,597 and Edwards et al. U.S. Pat. No. 4,137,265.

The phenolic compound to be employed in accordance with the present invention is phenol or a phenol having a hydrogen atom on one or more of the ring positions ortho and para to the hydroxyl group substituted with a $C_1$–$C_{12}$ straight chain or branched chain alkyl group. Representative compounds include phenol, methylphenol, ethylphenol, propylphenyl, hexylphenol, nonylphenol, dodecylphenol, etc.

The phenolic compound is reacted with formaldehyde and diethanolamine to form a Mannich condensate. Formaldehyde may be employed in its conventional form, as an aqueous formalin solution, in "inhibited" methanol solution, as paraformaldehyde, or as trioxane.

For example, the Mannich reaction is conducted by premixing the phenolic compound with a desired amount of the ethanolamine and then slowly adding formaldehyde to the mixture at a temperature below the temperature of Novolak formation (a temperature that will vary with the phenolic compound employed and is a temperature of less than about 45° C. when phenol itself is employed).

At the end of the reaction, water is stripped from the reaction mixture to provide thereby a crude Mannich reaction product. Although it is within the scope of the present invention to separate the crude reaction product by conventional means into specific components or fractions, it is a feature of the present invention that the entire crude Mannich reaction product may be used as such without isolation of individual components thereof. In accordance with the preferred embodiment of the present invention, the entire crude Mannich reaction product is used.

For example, the Mannich condensate may be a Mannich condensate of equimolar amounts of phenol, formaldehyde and diethanolamine. When a phenol substituted in the ortho or the para position with an alkyl group containing 1 to 12 carbon atoms is used, the Mannich condensate may suitably comprise the product obtained by reacting the substituted phenol with formaldehyde and diethanolamine in the mole ratio of about 1:2:2.

The reaction product is then alkoxylated with propylene oxide or with propylene oxide and ethylene oxide. The alkylene oxide component may suitably comprise 100% to about 80% propylene oxide and 0 to about 20 wt.% ethylene oxide and may comprise about 20% to about 50% of the alkoxylation product. (See Edwards et al. U.S. Pat. Nos. 3,297,597 and 4,137,265.)

The alkoxylation with propylene oxide is carried out by introducing the propylene oxide, preferably under pressure, into a vessel containing the Mannich reaction product. No added catalyst is needed since the basic nitrogen in this product provides sufficient catalytic activity to promote the reaction. Temperatures between about 30° C. and about 200° C. may be employed but the preferred temperatures are in the range of about 90° to 120° C. Under these conditions the phenolic hydroxyl group and the alkanolamino hydroxyls are reactive to form hydroxypropyl groups. Unreacted and partially reacted materials are removed from the final condensation product in any suitable manner (e.g., by vacuum stripping) to provide clear amber to brown liquids having hydroxyl numbers in the range of 400 to 550 and viscosities between about 10,000 and 45,000 centipoises at 25° C.

In accordance with the present invention the alkoxylated Mannich condensate, as above described, is mixed with a minor amount (e.g., about 3% to about 10% by weight based on the alkoxylated product) of melamine and with about 1 to about 6 moles of a lower alkylene carbonate per mole of melamine.

This mixture is then heated at a temperature of about 90° to about 210° C. and a pressure of about 1 to about 200 atmospheres for a period of time within the range of about 1 to about 5 hours to thereby provide a modified polyol useful in the manufacture of rigid polyurethane foam.

Manufacture of Rigid Polyurethane Foam

The components utilized for the manufacture of a rigid polyurethane foam include a polyol, an organic polyisocyanate, a blowing agent, a surfactant, a catalyst, suitable fire retardants and other additives.

The polyol component in the present invention comprises a modified alkoxylated Mannich condensate as just described used alone or in admixture with up to about 60 parts by weight of a polyoxypropylene polyol having a hydroxyl number between 200 and 800, preferably, between 300 and 700 and more preferably between about 400 and about 600, and a functionality of 2 to 6, and preferably from about 3 to 6.

Normally, propylene oxide will constitute from about 15 to about 95 wt.% of the total polyol composition. Up to about 10 wt.% of ethylene oxide may be utilized if desired, based on the weight of the propylene oxide.

A wide variety of initiators may be alkoxylated to form useful polyoxypropylene polyols. Thus, for example, polyfunctional amines and alcohols of the following types may be alkoxylated: monoethanolamine, diethanolamine, triethanolamine, ethylene glycol, polyethylene glycols, propylene glycols, polypropylene glycols, glycerine, sorbitol, and trimethylolpropane.

Such above amines or alcohols may be reacted with an alkylene oxide such as propylene oxide or mixtures of ethylene oxide and propylene oxide using techniques known to those skilled in the art. Thus, for example, the reaction of alkylene oxides with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol will determine the amount of alkylene oxide used to react with the initiator. The oxypropylene polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator with a mixture of propylene oxide and ethylene oxide to achieve a random distribution of such alkylene oxides. As noted above, the polyoxypropylene polyols useful here have a hydroxyl number ranging from about 200 to about 800. The reaction mixture is then neutralized and water and excess reactants are stripped from the polyol.

Typical aromatic polyisocyanates that may be used in the practice of the present invention include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

The more preferred methylene-bridged polyphenyl polyisocyanate mixtures used here contain from about 20 to about 100 wt.% methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt.% methylene diphenyl diisocyanate isomers, of which 20 to about 95 wt.% thereof is the 4,4'-isomer with the remainder being polymethylene polyphenyl polyisocyanates of higher molecular weight and functionality that have an average functionality of from about 2.1 to about 3.5. The isocyanate mixtures are known materials and can be prepared, for example, by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such materials are trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Other useful blowing agents including low-boiling hydrocarbons such as butane, pentane, hexane, cyclohexane, and the like. See U.S. Pat. No. 3,072,582, for example.

The catalysts which may be used to make the foams are well known. There are two general types of catalyst, tertiary amines and organo-metallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, diethylpiperazine, N-ethylmorpholine, dimethylaniline, nicotine, dimethylaminoethanol, tetramethylpropanediamine, and methyltriethylenediamine. Organo-metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organo-metallic compound are often used together in the polyurethane reaction.

Conventional formulation ingredients are also employed, such as, for example, foam stabilizers also known as silicone oils or emulsifiers. The foam stabilizer may be an organic silane or siloxane. For example, compounds may be used having the formula:

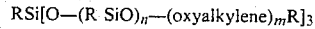

wherein R is an alkyl group consisting from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

The flame retardancy of the polyurethane composition can be enhanced by using known fire retardants. Examples of suitable flame retardants are: tris(1,3-dichloropropyl)phosphate, tris(2,3-dibromopropyl)phosphate, 2,2-bis(chloromethyl)-1,3 propylene bis[di(2-chloroethyl)phosphate], tris(2-chloroethyl)phosphate, tris(2-chloropropyl)phosphate, bis(dichloropropyl)tribromopentyl phosphate, tetrakis-(2-chloroethyl)ethylene diphosphate (sold by Olin Chemicals as THERMOLIN®101), FYROL®EFF (oligomeric chloroalkyl phosphate, sold by Stauffer Chemical Co.), tricresyl phosphate, cresyl diphenyl phosphate, chlorinated paraffins, and brominated paraffins. Halogenated phosphates are preferred flame retardants in the practice of this invention, such as tris(1,3-dichloropropyl)phosphate, tris(2-chloroethyl)phosphate, FYROL-®EFF, and tetrakis(2-chloroethyl)ethylene disphosphate. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range of from about 20 to about 60 parts by weight per 100 parts by weight of polyol in the reaction mixture. It is preferred to use from about 20 to about 40 parts by weight.

The rigid polyurethane foams can be made in one step by reacting all the ingredients together at once (one-shot process). The rigid foams can also be made by the so-called "quasi-prepolymer method" wherein a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

An advantageous aspect of the present invention is the comparative ease with which rigid polyurethane foams are made in the manner described above when using the polyol compositions of the present invention. Thus, comparatively faster reaction profiles are experienced (e.g., faster cream time, faster rise time, faster gel times, faster tack-free times, etc.).

SPECIFIC EXAMPLES

Example 1

Preparation of 2-Hydroxyalkylcarbamate Derivatives of Melamine

The propoxylated Mannich polyol used in this example was a polyol prepared by reacting phenol, formaldehyde and diethanolamine in the mole ratio of 1:1:1 in accordance with Edwards et al. U.S. Pat. No. 3,297,597 to provide a Mannich condensate which was then propoxylated with about 3 moles of propylene oxide per mole of phenol.

A one-liter three-neck flask, equipped with a mechanical stirrer, thermometer and water cooled condenser was charged with 500 g of the polyol described above (hydroxyl number, 534; 2.80 meq/g total titratable amine; 3.92% nitrogen; viscosity, 14,500 cps at 25° C.), 28.0 g (0.222 mole) of melamine and 136.0 g (1.332 moles) propylene carbonate (PC) or 117.3 g (1.332 moles) of ethylene carbonate (EC). The reaction mixture was vigorously stirred and heated to the desired temperature and held for the time indicated below. Pressure was about 1 atmosphere. The reaction mixture was then cooled to about 50° C. and filtered through filter aid to remove unreacted melamine. Analytical properties were determined on the liquid filtrates.

TABLE I

Properties of Polyols Prepared by Reacting Melamine with a Lower Alkylene Carbonate in the Presence of a Propoxylated Mannich Condensate of Phenol, Formaldehyde and Diethanolamine

| NB-Page No., 5474- | PC[1] | | | EC[2] | | |
|---|---|---|---|---|---|---|
| | 87 | 90 | 92 | 88 | 89 | 91 |
| T, °C. | 90 | 150 | 200 | 90 | 150 | 200 |
| (t, hrs.) | (2.5) | (6.0) | (1.5) | (2.5) | (6.0) | (2.0) |
| Product | | | | | | |
| OH No. | 414 | 425 | 446 | 428 | 507 | 502 |
| Total Amine, meq/g | 2.27 | 2.22 | 2.39 | 2.34 | 2.61 | 2.55 |
| % Nitrogen | 3.35 | 3.54 | 4.34 | 3.45 | 5.05 | 5.33 |
| Viscosity (25° C.), cs | 702 | 1,474 | 4,309 | 1,627 | 12,415 | 16,367 |
| % H₂O | 0.12 | 0.12 | 0.01 | 0.24 | 0.01 | 0.17 |
| Sap No. | 111.36 | 96.99 | 65.71 | 116.35 | 16.15 | 3.2 |

[1] Propylene carbonate
[2] Ethylene carbonate

EXAMPLE 2

Preparation of Rigid Polyurethane Foams

Rigid foams were prepared from two lots of Thanol R-350X (a commercial propoxylation product of a Mannich condensate of equimolar proportions of phenol, formaldehyde and diethanolamine) and a number of the experimental polyols. The formulation components were mixed at 2700 rpm and poured into 8"×8"×12" (600 g pour) open molds and allowed to rise. The resulting foams were allowed to stand at room temperature for at least three days before testing. Formulation and foam physical properties are listed below.

TABLE II

Preparation of Rigid Polyurethane Foams from Polyols of Example 1

| Formulation, pbw | 5474- | | 5566- | | |
|---|---|---|---|---|---|
| | 35-1 | 35-2 | 28-1 | 28-2 | 28-3 |
| R-350X, lot 1A-410 (OH = 534) | 36.0 | — | — | — | — |
| R-350X, 5474-06P (OH = 539) | — | 35.8 | — | — | — |
| 5474-89 (OH = 507) | — | — | 37.1 | — | — |
| -91 (OH = 502) | — | — | — | 37.3 | — |
| -92 (OH = 446) | — | — | — | — | 39.8 |
| Silicone DC-193 | 0.5→ | → | → | → | → |
| Freon R-11B | 13.0→ | → | → | → | → |
| Mondur MR (index = 1.10) | 50.5 | 50.7 | 49.4 | 49.2 | 46.7 |
| Times (sec), Mixing | 15 | 15 | 6 | 8 | 8 |
| Cream | 26 | 26 | 10 | 10 | 13 |
| Gel | 104 | 84 | 26 | 30 | 53 |
| Tack Free | 134 | 101 | 34 | 33 | 59 |
| Rise | 141 | 120 | 52 | 57 | 93 |
| Initial Surface Friability | None | None | Yes | None | None |
| Foam Appearance | Good | Good | Good | Good | Good |

Note the significantly shortened reaction profiles (mixing time, cream time, gel time, tack free time and rise time) observed with formulations 5566-28-1, 5566-28-2 and 5566-28-3 of the present invention, as compared with prior art formulations 5474-35-1 and 5474-35-2.

TABLE III

Physical Properties of Polyurethane Foams of Example 2

| Physical Properties | 5474- | | 5566- | | |
|---|---|---|---|---|---|
| | 35-1 | 35-2 | 28-1 | 28-2 | 28-3 |
| Density (lbs/ft³) | 2.05 | 1.98 | 2.13 | 1.96 | 2.02 |
| K-Factor | 0.122 | 0.122 | — | 0.101 | 0.106 |
| Comp. Str. (psi), w̄ rise | 48.89 | 40.56 | 47.89 | 47.29 | 45.56 |
| x̄ rise | 16.17 | 14.12 | 17.35 | 18.06 | 16.41 |
| Heat Distortion (°C.) | 171 | 170 | 168 | 171 | 145 |
| % Closed Cells | 92.27 | 91.97 | 94.14 | 95.90 | 93.08 |
| Friability (% wt. loss, 10 min.) | 3.88 | 5.20 | 1.87 | 1.32 | 4.07 |
| ASTM 1692 BURN, in/min (BHA) | 2.12 | 2.35 | — | 2.82 | 2.94 |
| Butler Chimney Test | | | | | |
| Flame height, in. | >11 | >11 | — | >11 | >11 |
| Sec. to extinguish | 20 | 28 | — | 31 | 37 |
| % wt. retained | 60.0 | 47.9 | — | 35.6 | 43.5 |
| Dimensional Stability | | | | | |
| 200° F., DRY, 1 wk., ΔV | +1.8 | +2.2 | — | +2.9 | +4.3 |
| 4 wks., ΔV | +6.5 | +6.2 | — | +5.0 | +12.3 |

As can be seen from Table III, good quality rigid polyurethane foams having good properties were prepared through the use of the modified polyol of the present invention.

The utilization of the lower alkylene carbonates to prepare products useful in the manufacture of rigid polyurethane foam can be successfully practiced using the process of the present invention as described above.

ditions and product analytical properties are listed below.

TABLE V

| | Preparation of Polyols by Reacting a Lower Alkylene Oxide and Carbon Dioxide with Melamine | | | | | |
|---|---|---|---|---|---|---|
| NB-Page No. | 5474-97 | 98 | 5566-01 | 02 | 03 | 04 |
| Moles | | | | | | |
| Melamine/$CO_2$/EO | 1/3/3 | 1/6/6 | — | — | 1/3/3 | 1/6/6 |
| Melamine/$CO_2$/PO | — | — | 1/3/3 | 1/6/6 | — | — |
| $K_2SnO_3$ cat. | — | — | — | — | 0.0027 | 0.0041 |
| T, °C. (t, hrs.) | 170 (4.0) | 170–175 (2.0) | 170 (4.0) | 170 (4.0) | 150 (3.3) | 150 (2.0) |
| Exotherm, °C. | 289 | 186 | None | 177 | 282 | None |
| P, psig | 1625–910 | 2000–975 | 1500–1420 | 1850–315 | 1475–1600 | 1550–1525 |
| Product | | | | | | |
| OH No. | 562 | — | No Reaction | No Reaction | 578 | No Reaction |
| % Nitrogen | 7.68 | 5.94 | | | 22.1 | |
| Viscosity (25° C.), cs | — | 23.5 | | | — | |
| (210° F.), cs | 711 | — | | | 200 | |
| % $H_2O$ | 0.18 | 0.82 | | | 0.36 | |
| Sap No. | 7.69 | 199.24 | | | 17.48 | |

Attempts to prepare a polyol by reacting melamine directly with a lower alkylene carbonate are not satisfactory either because of the unreactivity of the lower alkylene carbonate or because of its tendency to decompose. This is illustrated by the following example.

EXAMPLE 3

Preparation from Melamine and Alkylene Carbonates

The apparatus and procedure of Example 1 was used. Reaction conditions and product analytical properties are listed below.

TABLE IV

| | Preparation of Polyols from Melamine and a Lower Alkylene Carbonate | | |
|---|---|---|---|
| NB-Page No., 5474- | 94* | 95* | 96** |
| EC/Melamine (moles) | 3 | 6 | — |
| PC/Melamine (moles) | — | — | 3 |
| T, °C. (t, hrs.) | 190 (2.0) | 170 (1.0) | 175–210 (3.0) |
| Product | | | |
| OH No. | 532 | 478 | — |
| % Nitrogen | 15.6 | 14.3 | 0.25 |
| Viscosity (25° C.), cs | — | 3,799 | 2.0 |
| (210° F.), cs | 53 | — | — |
| % $H_2O$ | 0.01 | 0.01 | 1.77 |
| Sap No. | 0.78 | 0.83 | 530.7 |

*EC partially decomposed to gaseous products.
**Essentially no reaction.

As can be seen from Table IV, the ethylene carbonate partially decomposed during reaction to an extent sufficient to render the process commercially unattractive while the propylene carbonate was not reactive with the melamine under the conditions employed.

EXAMPLE 4

Preparation from Melamine, Carbon Dioxide and Alkylene Oxides

Attempts to prepare the 2-hydroxyalkyl carbamate derivative of melamine in situ also do not lead to satisfactory results as shown by the results set forth in the following example.

Runs were made in a one-liter stirred stainless steel autoclave. Reactants were melamine, solid carbon dioxide (dry-ice), ethylene oxide (EO), propylene oxide (PO) and, in several cases, potassium stannate catalyst. Some of the runs were quite exothermic. Reaction con- As can be seen from the results obtained in this example, the reaction between ethylene oxide or propylene oxide and carbon dioxide in the presence of melamine is very unstable as indicated by the lack of reactivity or the extreme exotherms that were experienced. That is to say, it is difficult to initiate the reaction, but once it is initiated it goes quite rapidly resulting in the formation of a high exotherm and a polyol having unpredictable properties. Moreover, even when a polyol is obtained, similar problems are encountered in using it to make rigid polyurethane foam. That is, the polyol will be unpredictably unreactive or overly reactive (e.g., excessively rapid rise times, gel times, etc.).

It will be understood that the foregoing examples are given by way of illustration only and not by way of limitation and that the scope of the present invention is defined solely by the appended claims.

What is claimed is:

1. A polyol composition prepared by reacting an alkoxylation product of a Mannich condensate with about 3 to about 10 percent by weight of melamine based on the alkoxylation product and with about 1 to about 6 moles of a lower alkylene carbonate per mole of melamine at about 80° to about 150° C. for about 1 to 5 hours, said alkoxylation product having been prepared by reacting an alkylene oxide component comprising from about 90 to 100 wt.% of propylene oxide and 0 to about 10 wt.% of ethylene oxide with a Mannich condensate, said Mannich condensate having been prepared by reacting a phenolic compound with formaldehyde and diethanolamine in the molar ratios of about 1 to about 3 moles of formaldehyde and about 1 to about 3 moles of diethanolamine per mole of said phenolic compound, said phenolic compound being selected from the group consisting of phenol and phenol substituted with an alkyl group containing 1 to 12 carbon atoms.

2. A composition as in claim 1 wherein the alkoxylation product is a Mannich condensate of equimolar amounts of phenol, formaldehyde and diethanolamine that has been reacted with propylene oxide, wherein the propylene oxide constitutes from about 20 to about 50 wt.% of the polyol composition and wherein the polyol composition has a hydroxyl number within the range of about 500 to about 650.

3. A composition as in claim 2 wherein the lower alkylene carbonate is ethylene carbonate.

4. A composition as in claim 2 wherein the lower alkylene carbonate is propylene carbonate.

5. A composition as in claim 1 wherein the alkoxylation component consists of propylene oxide, wherein said Mannich condensate is prepared by reacting nonylphenol with formaldehyde and diethanolamine in the molar ratio of about 2 moles of formaldehyde and 2 moles of diethanolamine per mole of nonylphenol, wherein the propylene oxide constitutes from about 20 to about 40 wt.% of the composition and wherein the composition has a hydroxyl number within the range of about 400 to about 500.

6. A composition as in claim 5 wherein the lower alkylene carbonate is ethylene carbonate.

7. A composition as in claim 5 wherein the lower alkylene carbonate is propylene carbonate.

8. A method for preparing a polyol composition which comprises reacting an alkoxylation product with about 3 to about 10 percent by weight of melamine and with about 1 to 6 moles of a lower alkylene carbonate per mole of melamine at about 80° to about 150° C. for about 1 to about 5 hours, said alkoxylation product having been prepared by reacting an alkylene oxide component comprising from about 90 to 100 wt.% of propylene oxide and 0 to about 10 wt.% of ethylene oxide with said Mannich condensate, said condensate having been prepared by reacting a phenolic component with about 1 to about 3 moles of formaldehyde and about 1 to about 3 moles of diethanolamine per mole of a phenolic component, said phenolic component being selected from the group consisting of phenol and phenol substituted with an alkyl group containing 1 to 12 carbon atoms.

9. A method as in claim 8 wherein the Mannich condensate is a condensate of equimolar amounts of phenol, formaldehyde and diethanolamine, wherein the alkylene oxide component consists of propylene oxide, wherein the propylene oxide constitutes from about 20 to about 50 wt.% of the polyol composition and wherein the composition has a hydroxyl number within the range of about 500 to about 650.

10. A method as in claim 9 wherein the lower alkylene carbonate is ethylene carbonate.

11. A method as in claim 9 wherein the lower alkylene carbonate is propylene carbonate.

12. A method as in claim 8 wherein the Mannich condensate is a condensate of nonylphenol, formaldehyde and diethanolamine reacted in the molar ratio of about 2 mols of formaldehyde and 2 mols of diethanolamine per mol of nonylphenol, wherein the alkylene oxide component consists of propylene oxide, wherein the propylene oxide constitutes from about 20 to about 40 wt.% of the composition and wherein the composition has a hydroxyl number within the range of about 400 to about 500.

13. A method as in claim 12 wherein the lower alkylene carbonate is ethylene carbonate.

14. A method as in claim 12 wherein the lower alkylene carbonate is propylene carbonate.

15. A method of preparing a rigid polyurethane foam composition which comprises reacting an excess of an aromatic polyisocyanate with a polyol component in the presence of a catalyst, a blowing agent, a surfactant and a fire retardant, said polyol component comprising about 40 to 100 wt.% of a modified alkoxylated Mannich condensate and, correspondingly, from about 60 to 0 wt.% of a polyoxypropylene polyol having a hydroxyl number between 200 and 800, said modified alkoxylated Mannich condensate comprising the reaction product of an alkoxylated Mannich condensate with about 3 to about 10 wt.% of melamine, based on said alkoxylation product and about 1 to 6 moles of a lower alkylene carbonate per mole of melamine, said alkoxylation product comprising a product prepared by reacting an alkylene oxide component comprising from about 90 to 100 wt.% of propylene oxide and, correspondingly, 0 to about 10 wt.% of ethylene oxide with a Mannich condensate prepared by reacting a phenolic compound with about 1 to about 3 moles of formaldehyde and about 1 to about 3 moles of diethanolamine per mole of a phenolic compound, said phenolic compound being selected from the group consisting of phenol and phenol substituted with an alkyl group containing 1 to 12 carbon atoms.

16. A method as in claim 15 wherein the Mannich condensate is a condensate of phenol, formaldehyde and diethanolamine in equimolar proportions.

17. A method as in claim 16 wherein the lower alkylene carbonate is ethylene carbonate.

18. A method as in claim 16 wherein the lower alkylene carbonate is propylene carbonate.

19. A method as in claim 15 wherein the Mannich condensate is a condensate of nonylphenol, formaldehyde and diethanolamine in the molar ratio of about 2 moles of formaldehyde and 2 moles of diethanolamine per mole of nonylphenol.

20. A method as in claim 19 wherein the lower alkylene carbonate is ethylene carbonate.

21. A method as in claim 19 wherein the lower alkylene carbonate is propylene carbonate.

* * * * *